United States Patent
Gwon et al.

(10) Patent No.: US 7,206,579 B2
(45) Date of Patent: Apr. 17, 2007

(54) ADAPTIVE IP HANDOFF TRIGGERING AND ITERATIVE TUNING OF IP HANDOFF TRIGGER TIMING

(75) Inventors: Youngjune Gwon, Mountain View, CA (US); Daichi Funato, Mountain View, CA (US); Guangrui Fu, Sunnyvale, CA (US); Atsushi Takeshita, Sunnyvale, CA (US)

(73) Assignee: NTT DoCoMo, Inc., Tokyo (JP)

( * ) Notice: Subject to any disclaimer, the term of this patent is extended or adjusted under 35 U.S.C. 154(b) by 655 days.

(21) Appl. No.: 10/184,360

(22) Filed: Jun. 27, 2002

(65) Prior Publication Data
US 2003/0119508 A1 Jun. 26, 2003

Related U.S. Application Data

(60) Provisional application No. 60/343,551, filed on Dec. 21, 2001.

(51) Int. Cl.
*H04Q 7/20* (2006.01)
*H04Q 7/00* (2006.01)
*H04J 3/16* (2006.01)

(52) U.S. Cl. ............... 455/436; 455/437; 455/438; 455/439; 455/442; 370/331; 370/332; 370/469

(58) Field of Classification Search ........... 455/436, 455/437–442, 67.1; 370/338, 331, 332, 333, 370/469
See application file for complete search history.

(56) References Cited

U.S. PATENT DOCUMENTS 5,353,307 A * 10/1994 Lester et al. ............. 375/233
6,018,661 A * 1/2000 Raith et al. ............. 455/437
6,466,797 B1 * 10/2002 Frodigh et al. ......... 455/456.1
6,507,740 B2 * 1/2003 Shi .......................... 455/437
6,587,686 B1 * 7/2003 Cuffaro et al. .......... 455/423
6,667,961 B1 * 12/2003 Park et al. ............... 455/436
2002/0061749 A1 * 5/2002 Hunzinger ............... 455/436

OTHER PUBLICATIONS

Network Working Group, C. Perkins, Ed., "IP Mobility Support," Oct. 1996, http://www.ietf.org/rfc/rfc2002.txt.
Johnson, D.B., Perkins, C.E., Arkko, J., IETF Mobile IP Working Group, "Mobilty Support in IPv6," Oct. 2002, http://www.ietf.org/internet-drafts/draft-ietf-mobileip-ipv6-19.txt.

(Continued)

*Primary Examiner*—Sonny Trinh
*Assistant Examiner*—Thai Vu
(74) *Attorney, Agent, or Firm*—Edward C. Kwok; MacPherson Kwok Chen & Heid LLP

(57) ABSTRACT

A method and system for providing an adaptive IP handoff triggering system for a wireless communication system that consists of either the same or heterogeneous wireless access technologies. A mobile node is notified of at least one pre-trigger timing parameter by a current access network. At least one variable handoff threshold is constructed with the mobile node based on the at least one pre-trigger timing parameter. An IP handoff is then initiated to a candidate access network when pilot beacon signal strength of the mobile node reaches the variable handoff threshold.

28 Claims, 4 Drawing Sheets

OTHER PUBLICATIONS

El Malki, K., Calhoun, P.R. Hiller, T., Kempf, J., McCann, P.J., Singh, A., Soliman, H. and Thalanany, S., "Low Latency Handoffs in Mobile IPv4," Jun. 2002, http://www.ietf.org/internet-drafts/draft-ietf-mobileip-lowlatency-handoffs-v4-04.txt.

Koodli, R., "Fast Handovers for Mobile IPv6," Jul. 1, 2002, http://yegin.org/alper/draft-ietf-mobileip-fast-mipv6-05.txt.

Kempf, J., Gwon, Y.L., Funato, D., Takeshita, A., Wood, J., "Post-handover Mobile Initiated Tunneling for Fast Mobile IPv4 Handover," Jun. 2002.

Kempf, J., Funato, D., El Malki, K., Gwon, Y., Pettersson, M., Roberts, P., Soliman, H., Takeshita, A., Yegin, A.E., "Supporting Optimized Handover for IP Mobility—Requirements for Underlying Systems," Nov., 2001.

Bernard Widrow and Samuel D. Stearns, "Adaptive Signal Processing", 1985, Prentice-Hall, Inc., Upper Saddle River, NJ, pp. 19-22.

* cited by examiner

At Mobile Node

At Access Networks

At Mobile Node

At Access Networks

ADAPTIVE IP HANDOFF TRIGGERING AND ITERATIVE TUNING OF IP HANDOFF TRIGGER TIMING

This application claims the benefit of U.S. Provisional Application Ser. No. 60/343,551, filed Dec. 21, 2001.

FIELD OF THE INVENTION

The present invention relates generally to handoffs in IP-based wireless access networks that consist of radio access points of either the same wireless access technologies or of the heterogeneous access technologies and more particularly, to adaptive IP handoff triggering and iterative tuning of IP handoff timing between access networks.

BACKGROUND OF THE INVENTION

In all IP-wireless communication networks it is crucial to provide handoff triggers that initiate IP handoffs that are seamless in the sense of minimizing both latency and data loss. One of the major benefits in IP-based mobility protocols is their applicability over a wide variety of wireless/wire-line access technologies at open systems interconnection (OSI) Layers 1 and 2. Many research projects that relate to IP handoffs have focused on supporting fast movement across access routers/mobility agents of the same access technology.

Considering no single wireless access technology can simultaneously provide low latency, high bandwidth, and global coverage, supporting seamless heterogeneous movement across access routers/mobility agents providing different access technology of so-called "multi-access" mobile nodes is a very interesting research issue. Multi-access mobile nodes are generally considered to have at least two or more network interface hardware. Unlike in homogeneous movement, layer 2 of multi-access mobile nodes cannot be provisioned or controlled within a monolithic framework. As a pragmatic illustration, typical handoff measurement by comparing pilot strengths from different base transceiver stations is meaningless if different technology pilots are considered.

Low latency IP handoff requires timely arrangement of sequencing handoff processes. It is known that layer 3 handoff processes should be initiated in advance upon the special information collected and driven from the underlying access technology, layer 2 trigger, to minimize latency, data loss, and other disruptions at the IP layer. In other words, layer 2 triggers (or any other forms) play a key role in achieving seamless IP mobility by governing handoff timing and delivering identities of handoff candidates.

Heterogeneous handoff triggering is really a problem of how coherency between entities of different access technologies and networks can be ensured. As an example, we consider homogeneous mobility in a cellular radio access network (RAN). Inter-cell movement within cellular RAN subsystems is completely provisioned and governed through distributed (or central) control entities such as a radio network controller (RNC). In such cases, network controllers have absolute knowledge about the mobile node's movements. This is possible since base stations and mobile nodes are required to report handoff measurements and other information to network controllers. By combining multiple reports from base stations and mobile nodes, the network controller allocates radio resources for mobile nodes and maintains the coherency among access network entities. Thus, the layer 3 can only follow the layer 2 mobility. In this case, layer 2 triggers that come from the access network can solve the issue of seamless IP handoff.

On the other hand, generating handoff triggers within required timing is trickier in heterogeneous cases. Although the current work in layer 2 triggers specifies types and formats of layer 2 triggers required by various handoff protocols, significantly missing pieces in the layer 2 trigger puzzle are how to generate these triggers and how to resolve the trigger timing issues that are crucial for seamless IP mobility.

Heterogeneous access network handoff triggering problems include the problem of generating layer 2 triggers. Layer 2 triggers exhibiting dependencies on access network support cannot be expected if inter-technology movement is considered. Examples of such are source and target triggers. Secondly, there is a problem with trigger timing in heterogeneous access network handoff triggering. Difficulties are observed in comparative handoff measurement and how to deduce trigger timing from it. Simply, handoff parameters such as beacon pilot strengths of different access technologies cannot be compared. Handoff decision is trickier since the motivation for a heterogeneous handoff can be due to either the fading/loss of the current connectivity or a connection improvement possibility via discovery of a new access network. These issues converge to decision factors of when to trigger a heterogeneous handoff being sufficient and necessary.

SUMMARY OF THE PRESENT INVENTION

The present invention discloses a predictive self-evaluation capability on handoff measurement employing an adaptive threshold. The present invention can be applied to handoff scenarios where movements across access points of both the same wireless access technology or heterogeneous wireless access technologies are considered. Adaptive mechanisms on both the access network entity (such as access router) and mobile node are considered by the present invention. Combining with successive handoff measurement (pilot strength), the present invention discloses an iterative process of obtaining advanced link down notification given a tunable time parameter. Inversely, the present invention also adaptively estimates anticipated link up time given successive handoff measurement on a candidate link.

The preferred embodiment of the present invention is broken into two parts: iterative tuning of handoff trigger timing provided by an access network handoff entity (such as a foreign agent) and a variable handoff threshold constructed by the mobile node. In the first part, the access network handoff entity (mobility agent/access router) computes the best estimate of a handoff trigger timing parameter, denoted by $\hat{T}_t$, iteratively using an adaptive algorithm. This iterative tuning of the handoff trigger timing parameter is performed in accordance that minimizes the layer 3 blackout duration based on the real-time feedback input.

The most recently available tuned handoff trigger timing parameter ($\hat{T}_t$) is then obtained by the mobile node. The mobile node constructs a variable handoff threshold based on the handoff trigger timing parameter ($\hat{T}_t$). To accomplish this, a mathematical mapping converts the trigger timing parameter into appropriate signal strength level (variable handoff triggering threshold) at the mobile node. The variable handoff threshold at the mobile node is constructed in such a manner that adapts to the current mobility status of the mobile node manifested by instantaneous handoff measurements (e.g. measuring pilot signal strength).

As outlined above a preferred embodiment of the present invention discloses a method and system for providing an adaptive handoff triggering system for a wireless communication system, comprising the steps of: notifying a mobile node of at least one pre-trigger timing parameter with a current access network; constructing at least one variable handoff threshold with the mobile node based on the at least one pre-trigger timing parameter; initiating a handoff to a candidate access network when a pilot beacon signal strength on the mobile node reaches the variable handoff threshold; reporting a blackout duration to the current access network with the mobile node; and retuning the pre-trigger timing parameter based on the blackout duration with the current access network.

Other features and advantages of the present invention will be apparent from the drawings and the more detailed description of the invention that follows. The foregoing discussion of the preferred embodiments has been provided by way of introduction. This section should not be construed as a limitation on the claims, which define the scope of the invention.

DETAILED DESCRIPTION OF THE PRESENTLY PREFERRED EMBODIMENTS OF THE INVENTION

Figure 1:
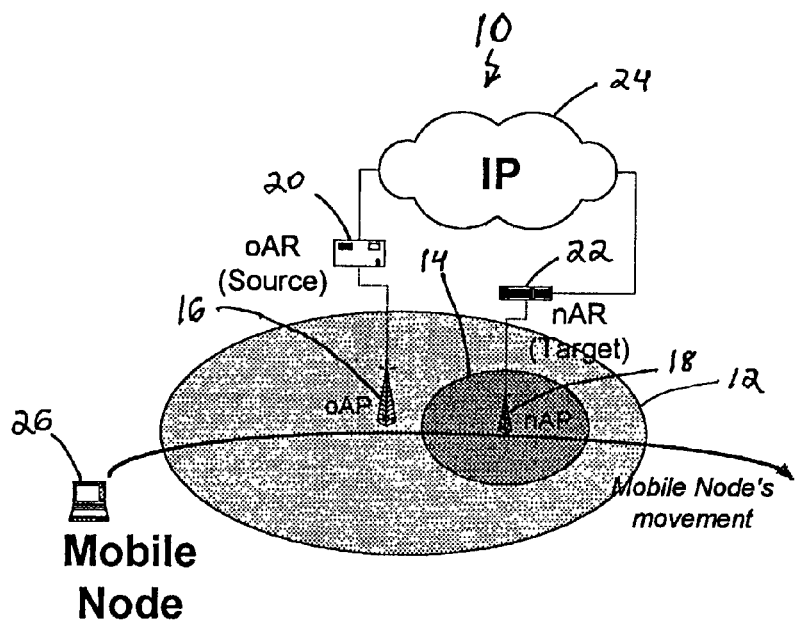
FIG. 1 illustrates a heterogeneous access network having access networks with overlayed coverage areas.

Referring to FIG. 1, a preferred embodiment of the present invention discloses an adaptive handoff triggering system for a heterogeneous access network 10, which in the preferred embodiment is an all-IP wireless access network. As illustrated in FIG. 1, the preferred heterogeneous access network 10 includes a plurality of access networks 12, 14 that have at least one access point 16, 18. The access points 16, 18 are represented as radio towers that are connected to respective access routers 20, 22 in FIG. 1. Each access router 20, 22 is preferentially interconnected through an IP-based network or backbone 24. Mobile nodes 26 are used to access the access networks 12, 14 and can freely travel from one respective access network to another during operation.

As illustrated in FIG. 1, different access points 16, 18 can have different ranges of air coverage and as such there is a variation in the coverage areas of the access networks 12, 14. The present invention relates to movement of mobile nodes 26 and how handoffs take place while mobile nodes 26 move between respective access networks 12, 14. The two cases of most interest are characterized by the type of coverage overlapping that is created by different access networks 12, 14 in the same vicinity. These are valid cases in the sense that inter-technology handoffs can occur and the two types of cases that most commonly occur are generally illustrated in FIGS. 1 and 2.

FIG. 1 illustrates an example of how access networks 12, 14 can have overlayed heterogeneous coverage where one coverage area is completely circumscribed or covered by another coverage area. Considering the larger coverage area as the source connection (see arrow as movement trajectory of the mobile node 26), the mobile node 26 may not notice the disruption in the source connection, but yet may discover another access possibility. When the mobile node 26 is in the vicinity of entering the smaller coverage region, the handoff (to the smaller coverage area) does not necessarily occur due to a loss of the current connection. Perhaps, the motivation for a handoff, in this situation, may be due to connection improvement, or it may be based on some subjective values such as preferences set by the mobile node 26 or user preferences.

Once the mobile node 26 is connected to the smaller coverage access point 18, coming out of the region creates an entirely different situation. Under this condition, motivation for a handoff back to the larger coverage access point 16 is considered connection loss driven. It is also noteworthy that low latency handoff are essential when coming out of smaller coverage areas. On the other hand, low latency handoff schemes become non-essential when coming into smaller coverage areas.

Figure 2:
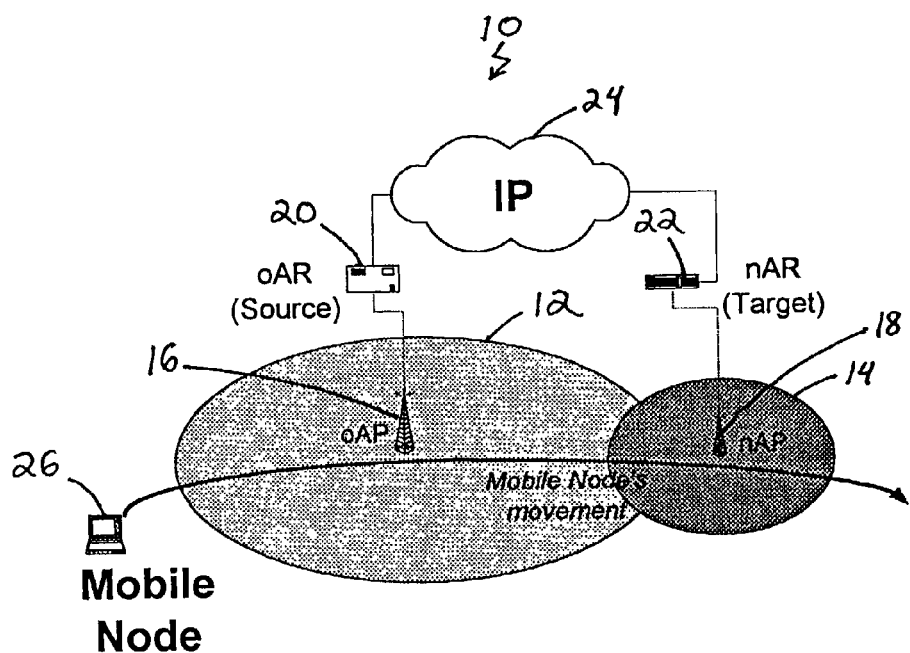
FIG. 2 illustrates a heterogeneous access network having access networks with contiguous coverage areas.

FIG. 2 illustrates an example of how access networks 12, 14 can have contiguous heterogeneous coverage where one coverage area is not completely circumscribed by another coverage area. In this scenario, two different access technologies have some overlapped coverage area in the vicinity of their respective outer boundaries. There is no complete enclosure by one coverage area to the other as depicted in FIG. 2. The motivation for a handoff in this situation is similar in the case of typical homogeneous movement between two contiguous cells, i.e. connection loss. This is a relatively more important situation than the overlayed coverage case because there is a possibility of disconnection if the handoff is triggered with improper trigger timing. Low latency handoff schemes are desired for this scenario as well.

The discussion below is devoted to describe heterogeneous handoff triggering mechanisms for multi-access mobile nodes 26. The handoff triggering mechanism described here is utilized at the mobile nodes 26. In heterogeneous access environments, it is difficult for access networks 12, 14 to make handoff decisions for mobile nodes 26. It is inevitable that mobile nodes 26 are naturally involved in heterogeneous handoffs because network triggers are difficult to generate if access technologies differ. However, it should be noted that a similar mechanism can be applied in access networks 12, 14 if the access networks 12, 14 are capable of making an appropriate handoff decision (on behalf of mobile nodes 26) without involvement of the mobile nodes 26.

The basic principle for defining a variable threshold is adaptation to mobility. Fast moving mobile nodes 26 may exhibit a relatively faster rate of decrease in handoff measurement (i.e. power level of pilot signal strength from the access point 16, 18 to the mobile note 26) in comparison to those of slowly moving mobile nodes 26. Secondly, the required trigger timing (before break off from the current connection) exhibits dependency on many factors. For example, different handoff schemes require different handoff control messaging over air or fixed links. Different access technologies can also have different channel access latency and transmission characteristics. Thus, a static setting of the variable threshold cannot guarantee removal of a link blackout. The present invention equips multi-access mobile nodes 26 with a self-evaluative mechanism that allows sufficient time to perform handoff signaling before the break up from their current connection. This is necessary when coherent handoff measurements at access networks 12, 14 are not possible such as in the case of heterogeneous movement of the mobile node 26.

Figure 3:
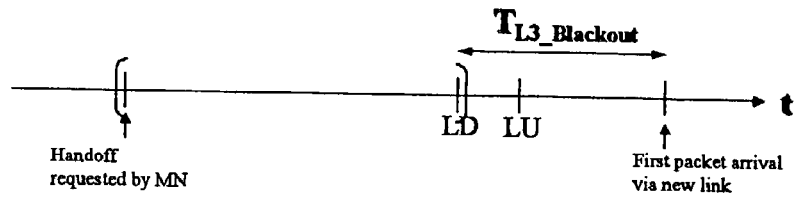
FIG. 3 illustrates an IP handoff timing diagram for a mobile node and access networks.
Figure 3:
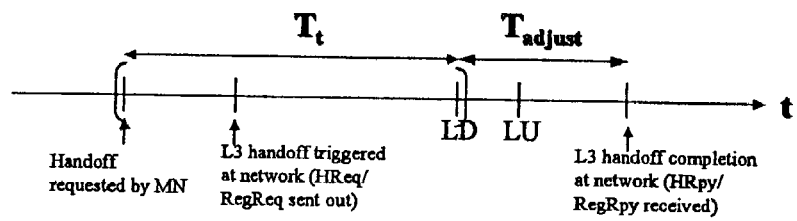

For the purpose of the present invention, the aforementioned required timing before the break up is defined as "trigger timing" or $T_t$. FIG. 3 illustrates the overall IP handoff timing diagram. The trigger timing is defined in relation to a link down (LD) with the current connection between a respective access network 12, 14 and/or mobile node 26, because this is a controllable parameter at the current access network. There is also an layer3 blackout duration that can be observed by the mobile node 26 when it is communicating actively while on the move.

Figure 5:
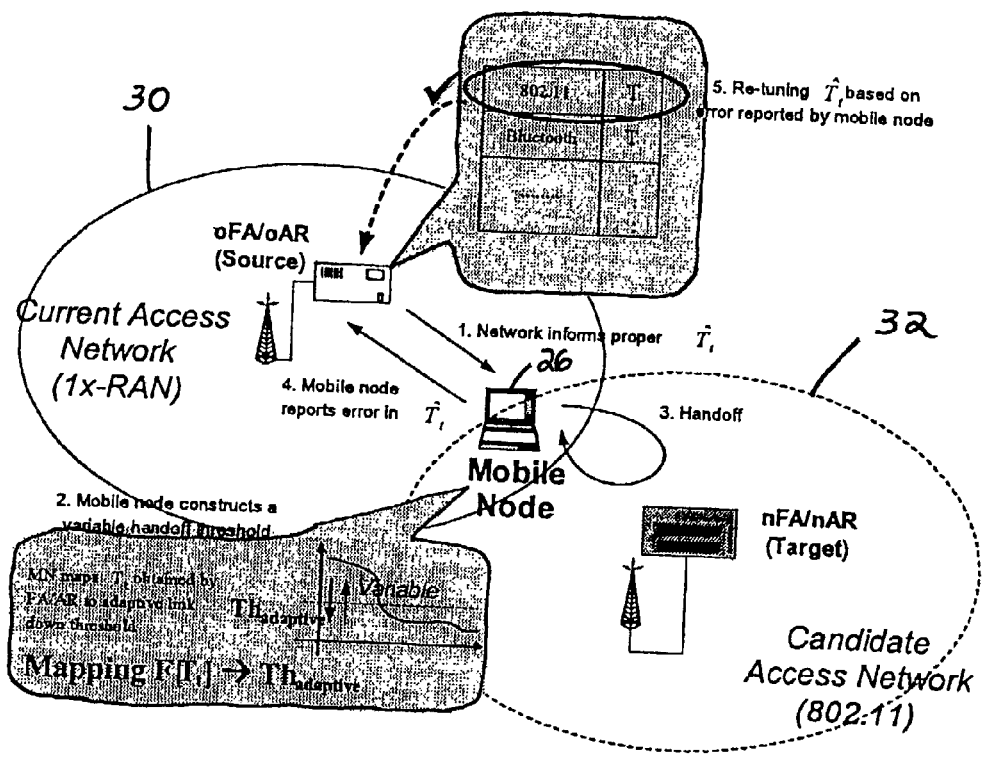
FIG. 5 illustrates a current access network and a candidate access network for the purposes of performing an adaptive handoff of a mobile node.

Referring to FIGS. 3 and 5, at first a handoff is requested by the mobile node 26 that is sent to the current access network 30. After the handoff request is sent by the mobile node 26, the current access network 30 triggers an layer 3 handoff. As such, a handoff request and a registration request are sent to a candidate access network 32 from the current access network 30. After the layer 3 handoff is triggered by the current access network 30, the connection between the current access network 30 and the mobile node 26 will go down, which is referred to as a link down ED). The time frame from when the mobile node 26 requests the handoff and when the link down (LD) occurs is defined as the "trigger timing" or $T_t$ in FIG. 3.

After the link or connection goes down between the current access network 30 and the mobile node 26, there is a blackout period between the time that the link goes down and the mobile node 26 receives the first packet of data from the new access network 32, which is defined as $T_{layer\ 3\_Blackout}$ in FIG. 3. The mobile node 26 begins receiving packets from the new access network 32 after the blackout period is over. After the link down (LD) occurs, the link between the mobile node 26 and the new access network 32 will come up, which is referred to as a link up (LU) in FIG. 3. The time frame from when the link down (LD) occurs and when the layer 3 handoff is complete at the new access network 32 is referred to as $T_{adjust}$ in FIG. 3. When the layer 3 handoff is complete the new access network 32 sends a handoff reply and a registration reply to the old access network 30.

Figure 4:
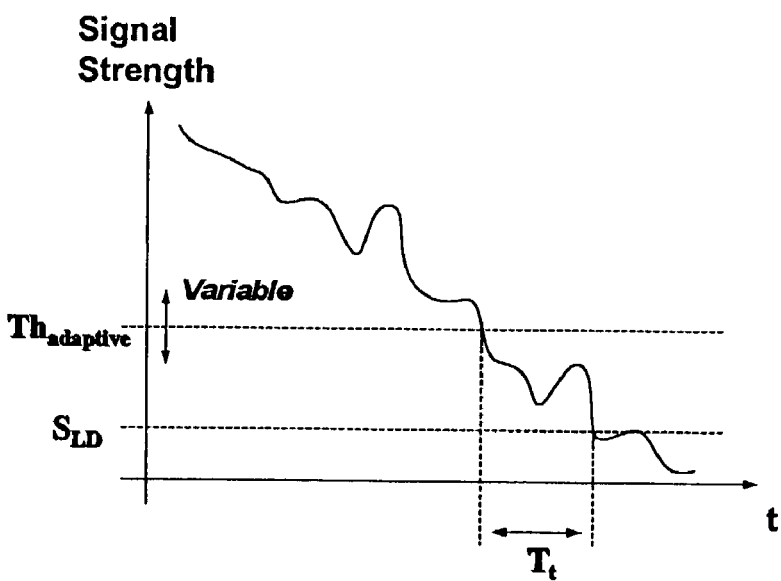
FIG. 4 illustrates handoff measurement with beacon pilot signal strengths and an adaptive handoff threshold for link down anticipation.

FIG. 4 represents a typical handoff measurement with the beacon pilot signal strengths that is performed by the mobile node 26 during a handoff. Given a link down power level ($S_{LD}$), the present invention defines a variable handoff threshold ($Th_{adaptive}$) above the link down power level ($S_{LD}$) in which an IP handoff is triggered when a recent measurement has met the variable handoff threshold ($Th_{adaptive}$). For example, the link down power level ($S_{LD}$) can be the minimum power level that the mobile node 26 can transmit or receive packets with tolerable errors. The variable handoff threshold ($Th_{adaptive}$) is adaptively placed such that the timing between the variable handoff threshold ($Th_{adaptive}$) and the link down power level ($S_{LD}$) is roughly equal to the trigger timing ($T_t$) required to handle the handoff messaging before the break off in communication between the mobile node 26 and the active access network 30.

In the preferred embodiment of the present invention, mathematical mapping is used to estimate the variable handoff threshold ($Th_{adaptive}$) in relation to the link down power level ($S_{LD}$), the trigger timing ($T_t$) and a pilot beaconing period ($T_{beacon}$). The pilot beaconing period ($T_{beacon}$) is preferentially a filtering period that combines multiple pilots for coherent measurement. As such, the preferred embodiment starts with the following equation, where Δ corresponds to the instantaneous decrease per beaconing period:

$$\frac{Th_{adaptive} - S_{LD}}{\Delta} \cdot T_{beacon} = T_t \quad (1)$$

By solving for the variable handoff threshold ($Th_{adaptive}$), the following equation is obtained:

$$Th_{adaptive} \cong \frac{T_t}{T_{beacon}} \cdot \Delta + S_{LD} \quad (2)$$

This mathematical formula (Equation 2) provides the functional mapping that relates the required timing before break off (e.g. trigger timing ($T_t$)) with the beacon pilot signal strength measurement. Using this equation, the mobile node 26 can construct an adaptive threshold as its self-contained link evaluation given the trigger timing ($T_t$), the link down power level ($S_{LD}$), and the instantaneous decrease per beaconing period (Δ). It should be noted that mobility adaptation is regulated by the measured instantaneous decrease per beaconing period (Δ).

Referring to FIG. 5, the preferred embodiment of the present invention consists of the following steps: tuning of pre-trigger timing at the current access network 30 and construction of the variable handoff threshold ($Th_{adaptive}$) at the mobile node 26. Pre-trigger timing is an advanced interval during which an IP handoff is triggered and completed with its control messaging before the link layer connectivity disappears. Mobile node 26 controlled IP handoff algorithms are suitable for heterogeneous (or inter-technology) handoffs since heterogeneous access networks 10 cannot provide network triggers such as source/target triggers in general.

In FIG. 5, a mobile node 26 is first notified of a pre-trigger timing parameter (denoted by $\hat{T}_t$ in the figure) that can be used for initiating IP handoff to candidate access points 32. The mobile node 26 can receive this information anytime after association with the current access network 30. The current access network 30 provides this information for previously identified handoff candidates (i.e.—access networks) of either the same or different access technologies.

Based the on the provided pre-trigger timing parameter ($\hat{T}_t$), the mobile node 26 constructs a variable handoff threshold ($Th_{adaptive}$). The variable handoff threshold ($Th_{adaptive}$) provides sufficient time to complete IP handoff signaling before the link layer connectivity at the current access network 30 disappears (link-down). When the lower layer handoff measurement meets the variable handoff threshold ($Th_{adaptive}$), an IP handoff is initiated by the mobile node 26 and it will have sufficient time to complete the IP handoff signaling before the link-down.

As previously set forth, to obtain the variable handoff threshold ($Th_{adaptive}$) a mathematical mapping equation that relates the received pilot beacon signal strength and time is used. The variable handoff threshold ($Th_{adaptive}$) is placed adaptively to reflect instantaneous handoff measurement.

After the handoff, the mobile node 26 reports an IP layer blackout duration back to the old access network 30 if it has experienced discontinuity. The IP layer blackout (or layer 3 blackout) duration is the interval during which the mobile node 26 is unable to receive or transmit any IP datagrams even though its link layer connectivity has already come up. The old access network 30 re-estimates or re-tunes the value of the pre-trigger timing parameter ($\hat{T}_t$) based on the report received from the mobile node 26.

The presence of an IP layer blackout creates the possibility of further optimization in the means of tuning the pre-trigger timing parameter ($\hat{T}_t$). Optimization is achieved by the present invention by using an adaptive algorithm. At each iteration, finer tuning is accomplished since the level of previous optimization is referenced by observing errors, i.e. presence and duration of the layer 3 blackout. The present invention uses this information iteratively as a feedback input to an adaptive tuner.

The current access network 30 is required to run the iterative adaptation algorithm to optimize the parameter setting of the pre-trigger timing parameter ($\hat{T}_t$). Since IP access network entities such as access routers or foreign agents are powerful computers, these entities are responsible for tuning, storing, and managing the timing parameters.

A heterogeneous access environment is characterized by diversities in numerous factors. Adaptation is the key quality that leads toward performance optimization in such environments. Static settings and deterministic approaches are less likely to become successful. The present invention minimizes handoff errors referenced by the layer 3 blackout. Consider the following equation:

$$\min \|T_{L3\_BO}\|^2 \approx \min_{(T_t, T_{adjust})} \|T_{L3\_HO\_fin} - T_{L3\_HO\_init} - T_t\|^2 \quad (3)$$

Figure 6:
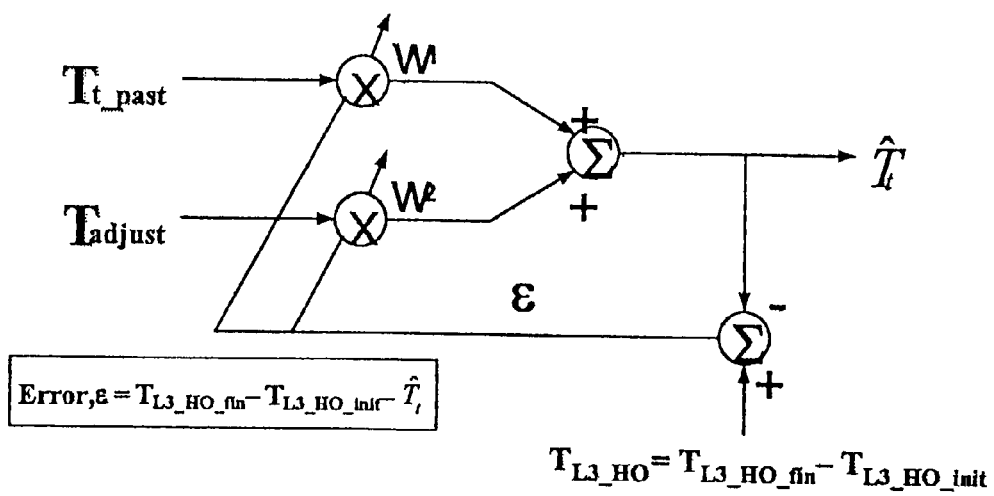
FIG. 6 illustrates an adaptive model of an iterative tuner based on a least mean square algorithm.

The preferred adaptive tuner is constructed with error feedback, by using the most recently pre-trigger timing parameter ($\hat{T}_t$) and the corresponding timing adjustment ($T_{adjust}$). At each iteration, the best estimate for the new trigger timing minimizes equation 3, the pre-trigger timing parameter ($\hat{T}_t$) is computed. In FIG. 6, adaptive modeling of the pre-trigger timing parameter ($\hat{T}_t$) tuner based on a Least Mean Square (LMS) algorithm is presented.

The past trigger timing ($T_{t\_past}$) can be a single valued or vector of n-previously used pre-trigger timing parameters ($\hat{T}_t$'s) and similarly for the timing adjustment ($T_{adjust}$) and error ($\epsilon$). The optimal LMS solution for the preferred iterative tuner is set forth as follows:

$$\hat{T}_t = [\, T_{t\_past} \quad T_{adjust} \,] \begin{bmatrix} \omega_1 \\ \omega_2 \end{bmatrix} \quad (4)$$

A weight vector (W) is denoted as $$W = \begin{bmatrix} \omega_1 \\ \omega_2 \end{bmatrix}$$

and the optimal weight vector that minimizes mean square error for the next iteration given present (and/or previous) inputs is:

$$W^* = W_{present} - 2\mu\epsilon X \quad (5)$$

where input vector $$X = \begin{bmatrix} T_{t\_past} \\ T_{adjust} \end{bmatrix},$$

$\mu$ is the gain constant that regulates the speed and stability of adaptation, and $\epsilon$ is represented as error feedback. The gain constant, $\mu$, is preferentially estimated in the following manner:

$$0 < \mu < \frac{1}{\text{tr}[R]} \quad (6)$$

where $R = XX^T$ and $$\text{tr}[R] = \sum (diagonal\, elements \text{ of } R) = \max \text{ Eigenvalue of } R.$$

It should be noted that this solution is based on single inputs. For vector inputs, the solution is in the form of proper vectors and matrices. Arithmetic operations are preferentially identical for both cases.

Another aspect of the present invention relates to an adaptive method to tune handoff trigger timing. This mechanism is employed at access network entities, which can include mobility agents/access routers. This aspect treats IP entities such as mobility agents/access routers and mobile nodes as autonomous entities that are capable of adaptation, automatic parameter training, self-provisioning/regulating, fault recovery, and so forth. It is also important to note that multi-access mobile nodes desiring low latency heterogeneous handoff are assumed to put their inactive interfaces at least into dormant/sleeping mode so that lower layer handoff measurement is possible.

Figure 7:
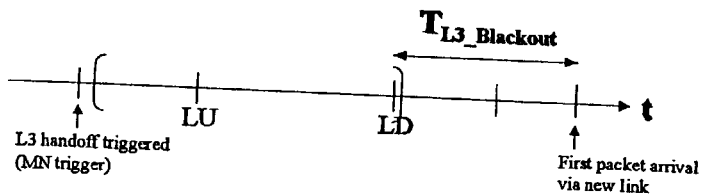
FIG. 7 illustrates an IP handoff timing diagram where a link up comes before a link down.
Figure 7:
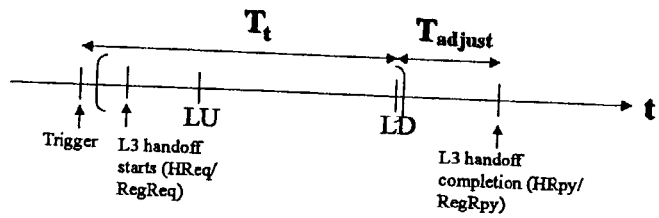
Figure 8:
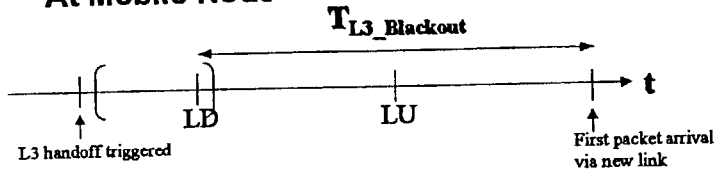
FIG. 8 illustrates an IP handoff timing diagram where a link down comes before a link up.
Figure 8:
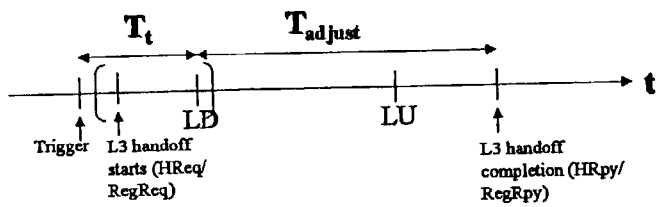

There are two case scenarios where at least two heterogeneous accesses are possible. FIGS. 7 and 8 depict these cases. The first case denotes the link up with the new access network 32 comes before the link down with the old access network 30. The second case is where link down comes first and then link up. The second case is more difficult since there is a layer 2 blackout duration that affects the layer 3 inherently. It should be noted that the link down is observed by the current access network 30, but link up with new access technology may not be observed by the current access network 30. However, the mobile node 26 can detect both link up and link down.

It is important to notice that the bracketed regions in FIGS. 7 and 8 represent optimal handoff completion times. In these regions, there is no layer 3 blackout after the link up. In the presence of layer 3 blackouts during active data sessions, the mobile node 26 can experience receiving delayed packets and possible packet loss. $T_{adjust}$ is one of the parameter inputs for the iterative process to reduce the effect of the layer 3 blackout duration. The present invention tunes the trigger timing ($T_t$) in such a way that the layer 3 handoff is completed before the link down. It is also noteworthy that there is a possible simultaneous multiple layer 2 connections in the link up before the link down case. However, multi-layer 2 does not automatically result in a simultaneous multi-layer 3 link unless the layer 3 handoff is completed within the bracketed regions.

As previously set forth, we must have enough trigger timing ($T_t$) at least before the link down with the current connection. Derivation of the trigger timing ($T_t$) comes from the time requirement of completing the handoff control messaging before the break off from the currently associated link of a mobile node 26. If the trigger timing ($T_t$) is too short, mobile nodes 26 suffer disconnection in the presence of the layer 3 blackout duration. Therefore, tuning the trigger timing ($T_t$) parameter is important to meet the requirement of the seamless heterogeneous mobility.

The principle of tuning the trigger timing ($T_t$) parameter in the present invention is based on layer 3 handoff completion. Given that there are several handoff schemes and there can be new schemes in the future, deterministic analysis of the trigger timing ($T_t$) based on handoff control messaging may not be sufficient to suit the objective of seamless IP mobility.

The present invention discloses a method of iterative handoff trigger timing ($T_t$) parameter tuning by employing an adaptive LMS algorithm. In comparison, static parameter tuning methods may result in significant error since many variables including trigger timing ($T_t$) and layer three blackout period are stochastic. Handoff measurement such as beacon pilot signal strength is also random and partly correlated with user mobility (e.g. speed) because air interface/wireless channel is also random. Assuming operating conditions are dynamic and subject to change/update, schemes without adaptation are unpromising.

On the other hand, iterative adaptation provides relatively low computational complexity. It is really statistical processing of the present and the correlated past information. Dynamic and instantaneous adaptation can be achieved by utilizing information about the past failure.

While the invention has been described in its currently best known modes of operation and embodiments, other modes and embodiments of the invention will be apparent to those skilled in the art and it is the following claims, including all equivalents, that are intended to define the spirit and scope of the invention.

What is claimed is:

1. A method for providing an adaptive handoff triggering system for a wireless communication system, comprising the steps of: notifying a mobile node of a value of a pre-trigger timing parameter with a current access network, said pre-trigger timing parameter being related to an estimated time duration between a layer 3 handoff request and a corresponding link layer disconnection; constructing a variable handoff threshold with said mobile node based on said pre-trigger timing parameter; and initiating a handoff to a candidate access network when a pilot beacon signal strength on said mobile node reaches said variable handoff threshold.

2. The method of claim 1, further comprising the step of reporting an IP blackout duration to said current access network.

3. The method of claim 2, further comprising the step of retuning said pre-trigger timing parameter based on said blackout period.

4. The method of claim 3, wherein an adaptive tuner is used to retune said pre-trigger timing parameter.

5. The method of claim 4, wherein said adaptive tuner uses an adaptive algorithm to retune said pre-trigger timing parameter.

6. The method of claim 5, wherein said adaptive algorithm comprises a least mean square algorithm.

7. The method of claim 1, wherein said variable handoff threshold is above a signal link down threshold.

8. The method of claim 1, wherein said variable handoff threshold is calculated based on a mathematical mapping equation.

9. The method of claim 8, wherein said mathematical mapping equation is defined as $$Th_{adaptive} = \frac{T_t}{T_{beacon}} * \Delta + S_{LD}.$$

10. A method of claim 1, wherein the handoff is initiated by the current access network.

11. A method of claim 1, wherein the handoff is initiated by the mobile node.

12. An adaptive handoff triggering system for a wireless access network, comprising: an active access network; and a mobile node connected to said active access network, wherein said mobile node is provided with at least one pre-trigger timing parameter by said active access network, said pre-trigger timing parameter being related to an estimated time duration between a layer 3 handoff request and a corresponding link layer disconnection, wherein said mobile node constructs a variable handoff threshold based on said pre-trigger timing parameter; and wherein when said mobile node comes within a radio range of a candidate access network, a handoff is initiated to said candidate access network when a beacon pilot signal strength on said mobile node reaches said variable handoff threshold.

13. The adaptive handoff triggering system of claim 12, wherein an IP blackout duration is reported to said active access network by said mobile node.

14. The adaptive handoff triggering system of claim 13, wherein said pre-trigger timing parameter is retuned based on said blackout duration.

15. The adaptive handoff triggering system of claim 14, wherein an adaptive tuner is used to retune said pre-trigger timing parameter.

16. The adaptive handoff triggering system of claim 15, wherein said adaptive tuner uses an adaptive algorithm to retune said pre-trigger timing parameter.

17. The adaptive handoff triggering system of claim 16, wherein said adaptive algorithm comprises a least mean square algorithm.

18. The adaptive handoff triggering system of claim 12, wherein said variable handoff threshold is above a signal link down threshold.

19. The adaptive handoff triggering system of claim 12, wherein said variable handoff threshold is calculated based on a mathematical mapping equation.

20. The adaptive handoff triggering system of claim 19, wherein said mathematical mapping equation is defined as $$Th_{adaptive} = \frac{T_t}{T_{beacon}} * \Delta + S_{LD}.$$

21. The adaptive handoff triggering system of claim 12, wherein the handoff is initiated by the current access network.

22. The adaptive handoff triggering system of claim 12, wherein the handoff is initiated by the mobile node.

23. A method for providing an adaptive handoff triggering system for a wireless communication system, comprising the steps of: transmitting a pre-trigger timing parameter to a mobile node, said pre-trigger timing parameter being related to an estimated time duration between a layer 3 handoff request and a corresponding link layer disconnection; measuring a beacon pilot signal strength between said mobile node and a current access network; and triggering a handoff to a candidate access network when said beacon pilot signal strength reaches a variable handoff threshold.

24. The method of claim 23, wherein the handoff is initiated by the current access network.

25. A method for providing an adaptive handoff triggering system for a wireless communication system, comprising the steps of: notifying a mobile node of a pre-trigger timing parameter with a current access network, said pre-trigger timing parameter relating to an estimated time duration between a layer 3 handoff request and a corresponding link layer disconnection; constructing a variable handoff threshold in said mobile node based on said pre-trigger timing parameter; initiating a handoff to a candidate access network when a pilot beacon signal strength on said mobile node reaches said variable handoff threshold; reporting an IP blackout duration to said current access network; and retuning said pre-trigger timing parameter based on said blackout duration.

26. The method of claim 25, wherein the handoff is initiated by the mobile node.

27. The method of claim 25, wherein the handoff is initiated by the current access network.

28. The method of claim 25, wherein the handoff is initiated by the mobile node.

* * * * *